United States Patent
Hughes et al.

(10) Patent No.: US 9,572,169 B2
(45) Date of Patent: Feb. 14, 2017

(54) SELECTING FREQUENCY FOR MULTI-BAND SMALL CELL

(71) Applicants: Verizon Patent and Licensing Inc., Basking Ridge, NJ (US); Cellco Partnership, Basking Ridge, NJ (US)

(72) Inventors: Kent W. Hughes, Oakland, CA (US); Arda Aksu, Martinez, CA (US); Donna L. Polehn, Kirkland, WA (US); Lalit R. Kotecha, San Ramon, CA (US); David Chiang, Fremont, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 95 days.

(21) Appl. No.: 14/189,171

(22) Filed: Feb. 25, 2014

(65) Prior Publication Data
US 2015/0245361 A1   Aug. 27, 2015

(51) Int. Cl.
*H04W 72/00* (2009.01)
*H04L 29/06* (2006.01)
*H04W 72/08* (2009.01)

(52) U.S. Cl.
CPC ............ *H04W 72/082* (2013.01); *H04L 67/42* (2013.01)

(58) Field of Classification Search
CPC ............... H04W 28/0205; H04W 28/0231; H04W 28/0236; H04W 28/0247; H04W 28/0257; H04W 28/0289; H04W 28/08; H04W 28/18; H04W 28/20; H04W 28/22; H04W 36/0088; H04W 36/04; H04W 36/06; H04W 36/08; H04W 36/16; H04W 36/165; H04W 36/20; H04W 36/22; H04W 36/245; H04W 36/30; H04W 36/38; H04W 36/385; H04W 40/12; H04W 40/16; H04W 72/0433; H04W 72/0453; H04W 72/0493; H04W 72/08; H04W 72/082; H04W 72/085; H04W 72/1226; H04W 72/1231; H04W 72/1257; H04W 88/12; H04W 92/12; H04W 84/02; H04W 84/04; H04W 84/045; H04W 84/105

USPC ................. 455/443, 444, 452.2, 435.2, 439, 448,455/449, 450, 525
See application file for complete search history.

(56) References Cited

U.S. PATENT DOCUMENTS

| | | | |
|---|---|---|---|
| 5,875,180 A * | 2/1999 | Wiedeman et al. | 370/320 |
| 2010/0075710 A1* | 3/2010 | Sutskover | H04W 52/325 455/522 |
| 2014/0003273 A1* | 1/2014 | Dimou et al. | 370/252 |
| 2014/0036862 A1* | 2/2014 | Lorca Hernando | 370/330 |
| 2014/0066050 A1* | 3/2014 | Kotecha et al. | 455/422.1 |

(Continued)

OTHER PUBLICATIONS

Wikipedia, "Small cell", http://en.wikipedia.org/wiki/Small_cell, Feb. 14, 2014, 5 pages.

*Primary Examiner* — Anthony Addy
*Assistant Examiner* — Martin Chang

(57) ABSTRACT

A device is configured to obtain interference information indicating interference levels at frequencies. The device is configured to determine a frequency for a small cell to use to communicate with a client device based on the interference information. The small cell is capable of using the frequencies to communicate and the frequency is determined from among the frequencies. The device is further configured to provide frequency information to the small cell instructing the small cell to communicate with the client device using the frequency.

18 Claims, 6 Drawing Sheets

(56) References Cited

U.S. PATENT DOCUMENTS

| | | | |
|---|---|---|---|
| 2014/0219122 A1* | 8/2014 | Nakamura et al. | 370/252 |
| 2014/0341061 A1* | 11/2014 | Shinada | H04W 16/18 370/252 |
| 2015/0133129 A1* | 5/2015 | Chiang et al. | 455/447 |

* cited by examiner

SELECTING FREQUENCY FOR MULTI-BAND SMALL CELL

BACKGROUND

A small cell may be a small or low-powered base station used to connect client devices (e.g., smart phones, computers, etc.) to an operator network. The small cell may be provided in a house, an office, or the like and connect to the operator network via a wired connection (e.g., cable, digital subscriber line (DSL), a T1 line, etc.). The small cell may communicate with the client devices wirelessly. Accordingly, client devices may connect to the operator network via the small cell rather than traditional macro base stations.

DETAILED DESCRIPTION OF PREFERRED EMBODIMENTS

The following detailed description of example implementations refers to the accompanying drawings. The same reference numbers in different drawings may identify the same or similar elements.

A small cell may be a multi-band small cell capable of using multiple frequencies or frequency bands to communicate with client devices. For example, a small cell may be a dual-band small cell capable of communicating using two frequency bands or a tri-band small cell capable of communicating using three frequency bands. However, a small cell may only be able to communicate with client devices using one frequency or frequency band at a time. Implementations described herein may allow an optimal frequency to be selected for the small cell to use to communicate with the client device from among the multiple frequencies. The optimal frequency may maximize throughput to the client devices, maximize a number of client devices that may connect to the small cell, reduce interference in a location of the small cell, and/or reduce a load on a frequency used by an operator network.

Figure 1:
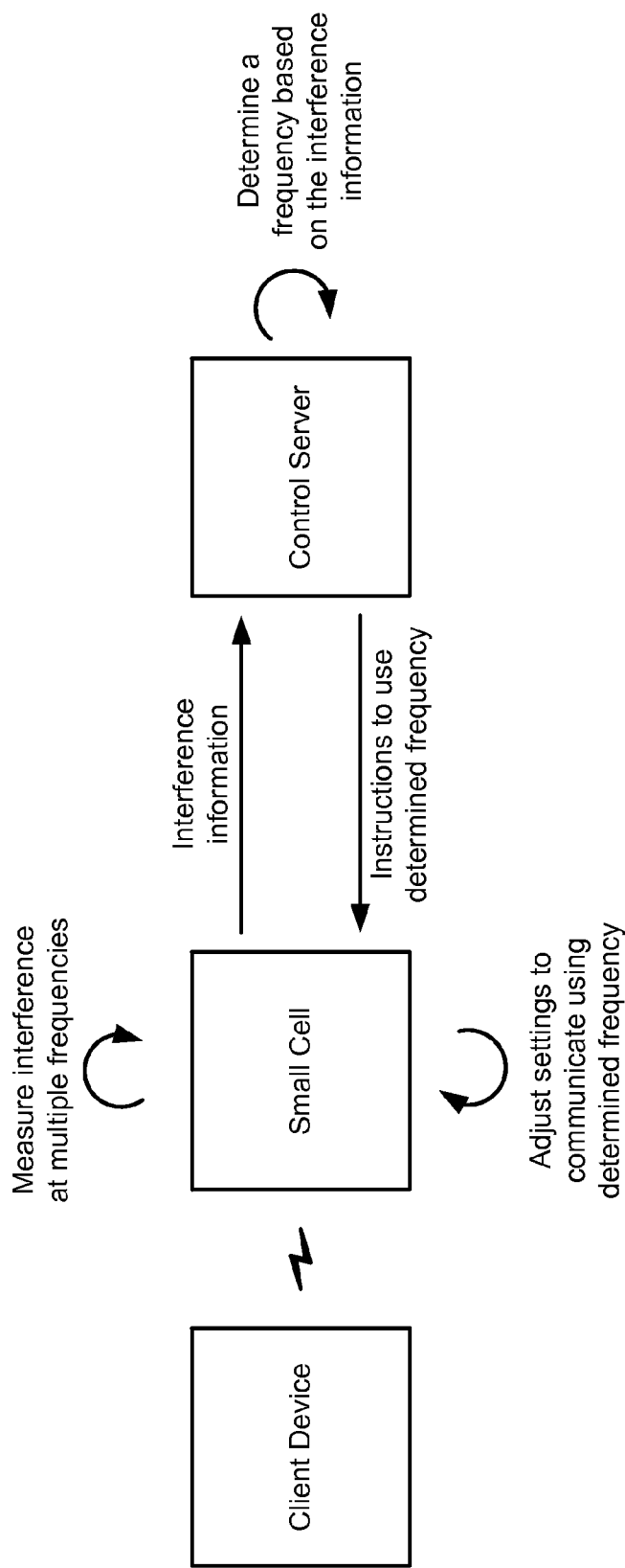
FIG. 1 is a diagram of an overview of an example implementation described herein.

FIG. 1 is a diagram of an overview of an example implementation 100 described herein.

Assume a client device connects to a small cell at a first frequency. Further, assume the client device and the small cell are both capable of using a second frequency to communicate.

The client device and/or the small cell may measure interference levels at the first frequency and the second frequency. The client device and/or the small cell may transmit interference information to a control server in an operator network. The interference information may indicate the interference levels at the first frequency and the second frequency.

The control server may receive the interference information. The control server may determine that the second frequency is the optimal frequency for the small cell and the client device to use to communicate based on the interference information. For example, the interference at the second frequency may be lower than the interference at the first frequency. Thus, the client device may experience a higher throughput using the second frequency than using the first frequency.

The control server may generate instructions to adjust frequency settings to use the second frequency instead of the first frequency. The control server may provide the instructions to the small cell and the client device. The small cell and the client device may receive the instructions and adjust the frequency settings to use the second frequency to communicate.

In this way, the small cell and the client device may use an optimal frequency to communicate from among the multiple frequencies the small cell and the client device are capable of using.

Figure 2:
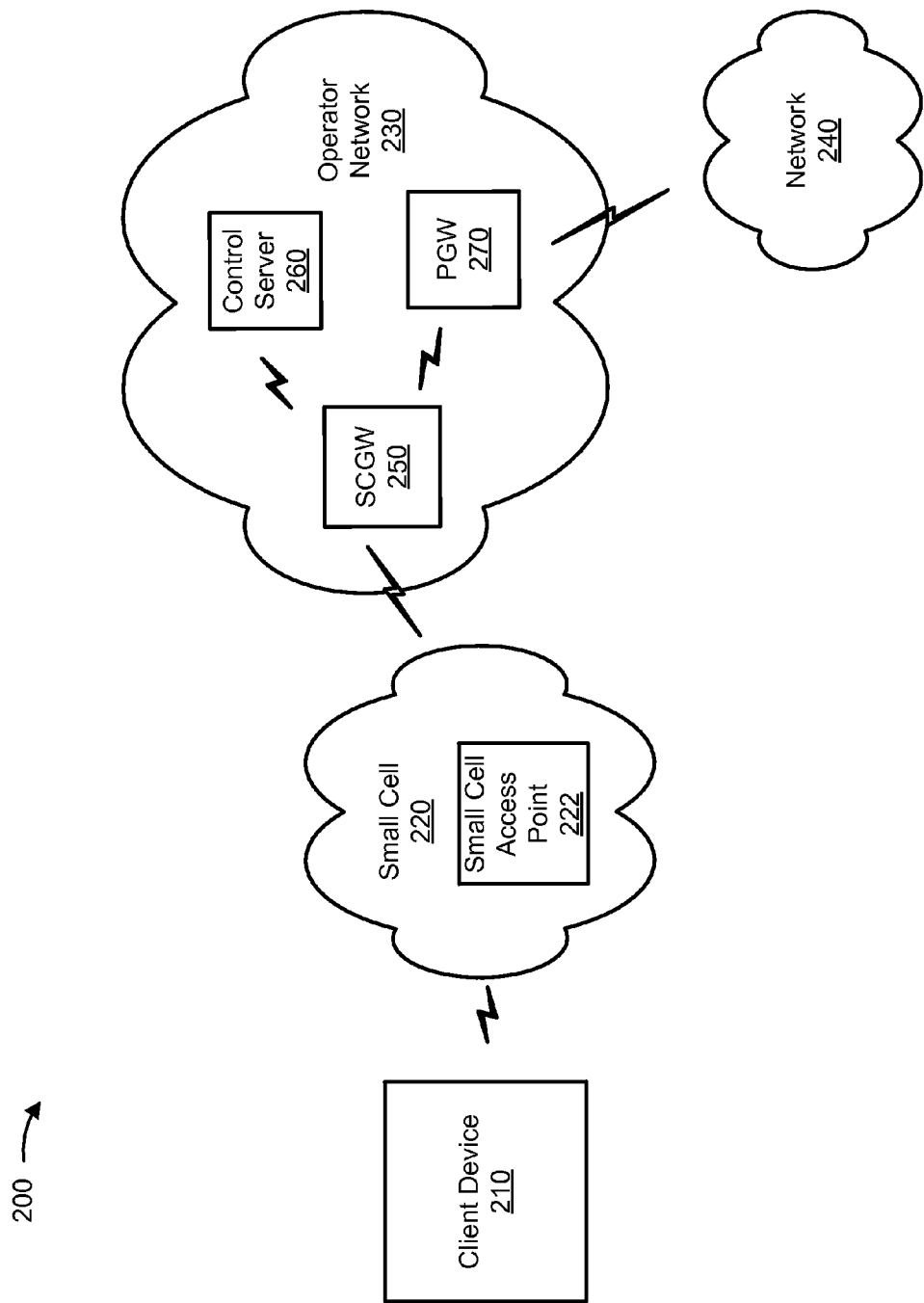
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a small cell 220, an operator network 230, and/or a network 240. Operator network 230 may include a small cell gateway 250 (hereinafter referred to as "SCGW 250"), control server 260, and/or a packet data network (PDN) gateway 270 (hereinafter referred to as "PGW 270").

Client device 210 may include a device capable of receiving and providing information. For example, client device 210 may include a mobile phone (e.g., a smart phone, a radiotelephone, etc.), a computing device (e.g., a desktop computer, a laptop computer, a tablet computer, a handheld computer, a camera, an audio recorder, a camcorder, etc.), a machine-to-machine (M2M) device, or a similar device. In some implementations, client device 210 may include a communication interface that allows client device 210 to receive information from and/or transmit information to small cell 220 and/or another device in environment 200.

Small cell 220 may include one or more network devices that receive, process, and/or transmit traffic, such as audio, video, text, and/or other data, destined for and/or received from client device 210. Small cell 220 may be a femtocell, a picocell, and/or a microcell. Small cell 220 may include a base station, an eNodeB (eNB) device, a small cell access point 222, etc. Small cell 220 may receive traffic from and/or send traffic to network 240 via SCGW 250 and PGW 270. Small cell 220 may send traffic to and/or receive traffic from client device 210 via an air interface. In some implementations, small cell 220 may connect to SCGW 250 of operator network 230 via a broadband connection (e.g., DSL, cable, and/or another wired broadband connection). Small cell 220 may be a multi-band small cell capable of communicating using multiple bands or frequencies.

Operator network 230 may include an evolved packet system (EPS) that includes a long term evolution (LTE) network and/or an evolved packet core (EPC) that operate based on a third generation partnership project (3GPP) wireless communication standard. In some implementations, the LTE network may be a radio access network (RAN) that includes one or more macro base stations, such as eNBs, via which client device 210 communicates with the EPC. Operator network 230 may include SCGW 250, control server 260, and/or PGW 270 that enable client device 210 to communicate with network 240 and/or an Internet protocol (IP) multimedia subsystem (IMS) core. Operator network 230 may include multiple SCGWs 250, control servers 260, and/or PGWs 270. Additionally, or alternatively, operator network 230 may include a cellular network, a public land mobile network (PLMN), a second generation (2G) network, a third generation (3G) network, a fourth generation (4G) network, a fifth generation (5G) network, and/or another network.

Network 240 may include one or more wired and/or wireless networks. For example, network 240 may include a cellular network, a PLMN, a 2G network, a 3G network, a 4G network, a 5G network, a LTE network, and/or a similar type of network. Additionally, or alternatively, network 270 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

SCGW 250 may include one or more network devices, or other types of computation or communication devices, that gather, process, search, store, and/or provide information in a manner described herein. SCGW 250 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SCGW 250 may, for example, aggregate traffic received from one or more small cells 220 and may send the aggregated traffic to network 240 via PGW 270.

Control server 260 may include one or more devices capable of processing and/or routing information. In some implementations, control server 260 may include a communication interface that allows control server 260 to receive information from and/or transmit information to other devices in environment 200 (e.g., SCGW 250).

PGW 270 may include one or more network devices that gather, process, search, store, and/or provide information in a manner described herein. PGW 270 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 270 may, for example, provide connectivity of client device 210 to external packet data networks by being a traffic exit/entry point for client device 210. PGW 270 may perform policy enforcement, packet filtering, charging support, lawful intercept, and/or packet screening.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
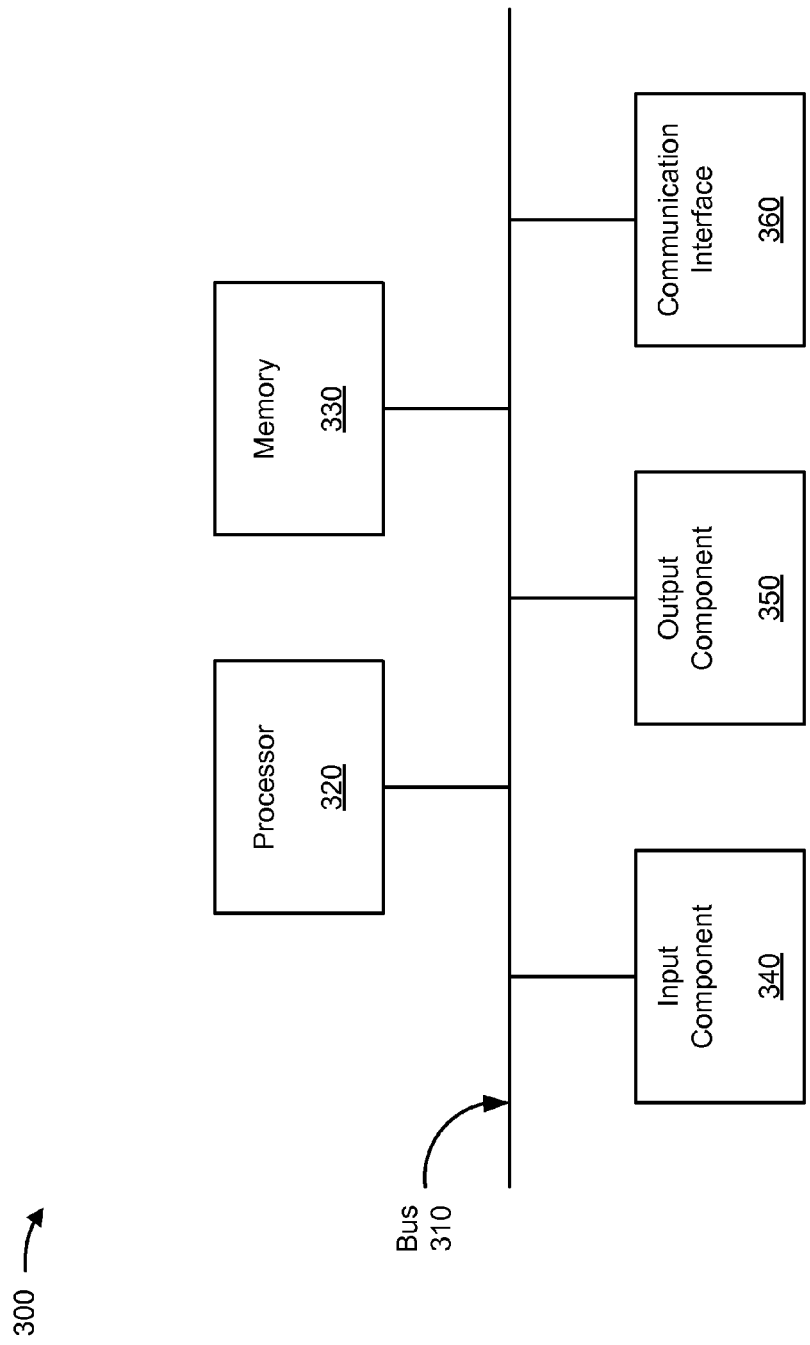
FIG. 3 is a diagram of example components of a device that corresponds to one or more devices of FIG. 2.

FIG. 3 is a diagram of example components of a device 300 that corresponds to one or more devices of FIG. 2. Device 300 may correspond to client device 210, small cell 220, small cell access point 222, SCGW 250, control server 260, and/or PGW 270. Additionally, or alternatively, client device 210, a device included in small cell 220, small cell access point 222, SCGW 250, control server 260, and/or PGW 270 may include one or more devices 300 and/or one or more components of device 300.

As illustrated in FIG. 3, device 300 may include a bus 310, a processor 320, a memory 330, an input component 340, an output component 350, and/or a communication interface 360.

Bus 310 may include a path that permits communication among the components of device 300. Processor 320 may include a processor (e.g., a central processing unit, a graphics processing unit, an accelerated processing unit), a microprocessor, a digital signal processor, and/or another type of processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Input component 340 may also include a sensor for sensing information (e.g., a GPS device).

Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
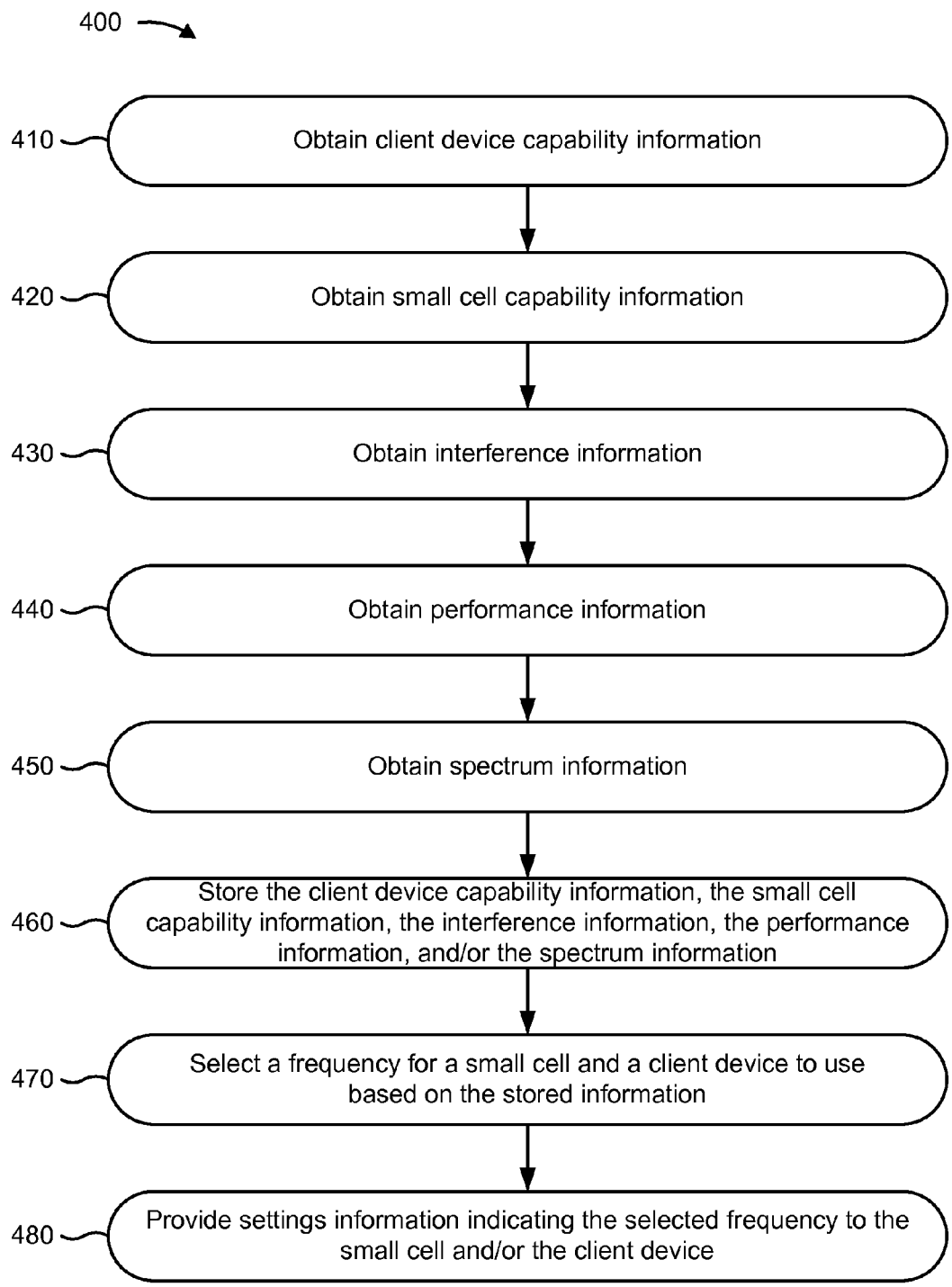
FIG. 4 is a flowchart of an example process for determining a frequency for a small cell to use.

FIG. 4 is a flowchart of an example process 400 for determining a frequency for small cell 220 to use. In some implementations, one or more process blocks of FIG. 4 may be performed by control server 260. Additionally, or alternatively, one or more process blocks of FIG. 4 may be performed by another device or a group of devices separate from or including control server 260, such as small cell access point 222.

As shown in FIG. 4, process 400 may include obtaining client device capability information (block 410). For example, control server 260 may obtain the client device capability information indicating frequency capabilities of client devices 210.

One or more client devices 210 may connect to small cell 220 to connect to operator network 230. Each client device 210 may be capable of communicating with small cell 220 using one or more frequencies and/or frequency bands. In some implementations, each client device 210 may store client device capability information. The client device capability information may indicate which frequencies client device 210 is capable of using to communicate.

In some implementations, control server 260 may send each client device 210 connected to small cell 220 a request to provide client device capability information. Additionally, or alternatively, control server 260 may send the request to each client device 210 connected to a macro base station having a coverage area that includes small cell 220. Client device 210 may receive the request and transmit the client device capability information and a client device identifier (ID) to control server 260 via operator network 230. The client device ID may include a phone number, an IP address, an international mobile subscriber identity ("IMSI"), an international mobile station equipment identity ("IMEI"), a mobile equipment identifier ("MEID"), or the like. Additionally, or alternatively, each client device 210 may transmit the client device capability information and the client device ID to control server 260 automatically and/or at predetermined times. In some implementations, small cell 220 and/or a macro base station may obtain the client device capability information from client device 210 and transmit the client device capability information to control server 260. Control server 260 may receive the client device capability information and store the client device capability information in a memory included in control server 260.

In some implementations, operator network 230 may store a subscriber data structure in a memory. The subscriber data structure may associate a client device ID with client device capability information for each client device 210. When a client device 210 connects to small cell 220, client device 210 may transmit a client device ID to control server 260 via SCGW 250. Control server 260 may receive the client device ID, query the subscriber data structure using the client device ID, and obtain the client device capability information for the client device 210 associated with the client device ID.

In some implementations, the subscriber data structure may include a client device profile associated with the client device ID. The client device profile may include a usage history that indicates which frequency or frequencies client device 210 has used in the past and/or if there is a preferred frequency for client device 210 to use. Additionally, or alternatively, the client device profile may indicate whether client device 210 is associated with a very important person (VIP) account (e.g., a police account, a first responder account, etc.).

In some implementations, small cell 220 may be associated with a closed subscriber group (CSG). The CSG may be a group of client devices 210 that are allowed to connect to small cell 220. Client devices 210 and/or an operator of small cell 220 may provide information, including client device capability information and a client device ID, to register a client device 210 in the CSG. Small cell 220 and/or control server 260 may store the client device capability information and the client device IDs, for the client devices 210 in the CSG, in a CSG data structure stored in a memory. When a client device 210 in the CSG connects to small cell 220, the client device 210 may transmit the client device ID to control server 260 via SCGW 250. Control server 260 may receive the client device ID, query the CSG data structure using the client device ID, and obtain the client device capability information for the client device 210 associated with the client device ID.

As shown in FIG. 4, process 400 may include obtaining small cell capability information (block 420). For example, control server 260 may obtain small cell capability information indicating frequency capabilities of small cell 220.

One or more small cells 220 may connect to operator network 230. Each small cell 220 may be capable of communicating with client devices 210 using one or more frequencies and/or frequency bands. In some implementations, each small cell 220 may store small cell capability information. The small cell capability information may indicate which frequencies small cell 220 is capable of using to communicate.

In some implementations, control server 260 may send small cell 220 a request to provide small cell capability information. Small cell 220 may receive the request and transmit the small cell capability information and a small cell ID to control server 260 via operator network 230. Additionally, or alternatively, small cell 220 may transmit small cell capability information and the small cell ID to control server 260 automatically and/or at predetermined times. Control server 260 may receive the small cell capability information from each small cell 220 and store the small cell capability information in a memory included in control server 260.

In some implementations, small cell 220 may send the small cell ID to control server 260. Based on the small cell ID, control server 260 may identify a kind of small cell access point (e.g., a make and/or model) of small cell access point 222. Control server 260 may obtain small cell capability information for small cell 220 based on the kind of small cell access point. For example, control server 260 may access a data structure storing an association between a kind of small cell access point and small cell capability information. Control server 260 may query the data structure using the kind of small cell access point and/or the small cell ID and obtain the associated small cell capability information.

As shown in FIG. 4, process 400 may include obtaining interference information (block 430). For example, control server 260 may obtain interference information indicating interference at various frequencies.

Small cell 220 and/or client devices 210 connected to small cell 220 may measure interference levels at frequencies where small cell 220 and/or client devices 210 are located. In some implementations, a macro base station included in operator network 230 and/or client devices 210 connected to the macro base station may measure interference levels. Small cell 220 may be located in a coverage area of the macro base station.

Small cell 220, client devices 210, and/or the macro base station may store interference information indicating the interference levels at the different frequencies. In some implementations, the interference information may indicate a time and/or date the interference level is measured. An interference level may be measured by measuring a signal strength of a signal received at a frequency. A signal strength may be inversely proportional to an interference level.

Small cell 220, client devices 210, and/or the macro base station may transmit the interference information to control server 260. Control server 260 may receive the interference information.

As shown in FIG. 4, process 400 may include obtaining performance information (block 440). For example, control server 260 may obtain performance information indicating throughput of client devices 210 connected to small cell 220 at a frequency used by small cell 220.

Each client device 210 connected to small cell 220 may measure a throughput and/or a bandwidth at client device 210 at different times. Each client device 210 may record the frequency used at the different times that the throughput and/or bandwidth is measured. Client devices 210 may store performance information indicating the throughput and/or the bandwidth, a time the measurement is taken, and a frequency used at the time the measurement is taken.

Client devices 210 may transmit the performance information to control server 260. Control server 260 may receive the performance information.

As shown in FIG. 4, process 400 may include obtaining spectrum information (block 450). For example, control server 260 may obtain the spectrum information indicating available frequencies.

Operator network 230 may have authority to use some frequencies and may not have authority to use other frequencies. For example, another operator network 230 may own the rights to some frequencies. Accordingly, operator network 230, and thus small cell 220, may not be able to use some frequencies for communication with client devices 210 even if small cell 220 and/or client devices 210 are capable of communicating via these frequencies.

Control server 260 may obtain spectrum information indicating which frequencies are available for use by small cell 220 from operator network 230. Furthermore, the frequencies that operator network 230 has authority to use may change over time. Accordingly, control server 260 may obtain spectrum information from operator network 230 periodically to ensure the spectrum information is up to date.

As shown in FIG. 4, process 400 may include storing the client device capability information, the small cell capability information, the interference information, the performance information, and/or the spectrum information (block 460). For example, control server 260 may store the client device capability information, the small cell capability information, the interference information, the performance information, and the spectrum information.

Control server 260 may store the client device capability information, the small cell capability information, the interference information, the performance information, and the spectrum information in a memory included in or accessible by control server 260.

In some implementations, control server 260 may store a history data structure for each small cell in a memory included in or accessible by control server 260. The history data structure may include an entry associating information indicating a time, a frequency used by small cell 220 at the time, an interference of the frequency at the time, and a throughput at the time. The history data structure may include multiple entries for different times. In some implementations, the history data structure may include entries associating a client device ID, client device capability information for a client device 210 associated with the client device ID, and times the client device 210 associated with the client device ID connects to small cell 220.

As shown in FIG. 4, process 400 may include selecting a frequency for small cell 220 to use based on the client device capability information, the small cell capability information, the interference information, the performance information, and/or the spectrum information (block 470). For example, control server 260 may select a frequency for small cell 220 to use. In some implementations, control server 260 may select a band and/or a channel as the frequency for small cell 220 to use. Additionally, or alternatively, small cell 220 may select a frequency to use.

In some implementations, control server 260 may select a frequency for small cell 220 to use based on the spectrum information. For example, the spectrum information may indicate permitted frequencies small cell 220, client devices 210, and/or operator network 230 are permitted to use. For example, operator network 230 may own the rights to use some frequencies that small cell 220 is capable of using, but not rights to all frequencies that small cell 220 is capable of using. Accordingly, control server 260 may select a permitted frequency as the selected frequency.

In some implementations, control server 260 may select the lowest frequency small cell 220 is capable of using as the selected frequency. The small cell capability information may indicate the lowest frequency. The lowest frequency may be selected to provide the greatest coverage area because lower frequencies have greater coverage area than higher frequencies. In some implementations, the lowest frequency may be selected as a default frequency or an initial frequency for small cell 220 and client devices 210 connected to small cell 220 to use. In some implementations, control server 260 may select the lowest frequency from among frequencies that small cell 220 is capable of using and small cell 220 is permitted to use.

In some implementations, control server 260 may select a frequency that each client device 210 is capable of using and/or that the most client devices 210 are capable of using as the selected frequency. The client device capability information may indicate that each client device 210 connected to small cell 220 share a common frequency that the client devices 210 are capable of using. Additionally, or alternatively, the client device capability information may indicate that a common frequency is shared by more client devices 210 connected to small cell 220 than other frequencies. Accordingly, control server 260 may selected the common frequency as the selected frequency to maximize the number of client devices 210 that may connect to small cell 220. In some implementations, control server 260 may select the common frequency from among frequencies that small cell 220 is capable of using and small cell 220 is permitted to use.

In some implementations, control server 260 may select a frequency based on the client device profiles of client devices 210 connected to small cell 220. For example, the client device profiles may indicate a preferred frequency for each client device 210. Control server 260 may select a most common preferred frequency as the selected frequency. In some implementations, the client device profiles may indicate frequencies that each client device 210 has used in the past. Control server 260 may select a most common frequency used in the past as the selected frequency. Additionally, or alternatively, the client device profiles may indicate whether a client device 210 associated with a VIP account is connected to small cell 220. If a client device 210 associated with a VIP account is connected to small cell 220, control server 260 may select a frequency the client device 210 associated with the VIP account is capable of using and/or select the preferred frequency for the client device 210 associated with the VIP account as the selected frequency. If multiple client devices 210 associated with VIP accounts are connected to small cell 220, control server 260 may select a frequency that each client device 210 associated with a VIP account is capable of using and/or that the most client devices 210 associated with the VIP accounts are capable of using as the selected frequency.

In some implementations, control server 260 may select a frequency based on the interference levels of frequencies. The interference information may indicate interference levels of frequencies. Control server 260 may select a frequency with the lowest interference level at a current time to minimize interference between small cell 220 and client device 210. For example, if small cell 220 is a residential small cell and/or associated with a CSG, control server 260 may select the frequency with the lowest interference level to minimize interference for client devices 220 connected to the small cell. On the other hand, control server 260 may select a frequency with the highest interference level at the time to offload client devices 210 from a macro base station in operator network 230 using the same frequency. For example, if control server 260 obtains interference information from the macro base station, control server 260 may reduce the load on the macro base station by having client devices 210 that are connected to the macro base station at a certain frequency connect to the small cell 220 at the same frequency.

In some implementations, control server 260 may select a frequency based on throughput of client devices 210 connected to small cell 220 as the selected frequency. Client devices 210 may experience different levels of throughput at different frequencies. The performance information may indicate the throughput for different frequencies. Accordingly, control server 260 may select a frequency with the maximum throughput based on the performance information.

Additionally, or alternatively, control server 260 may select a frequency based on the throughput associated with a current interference level. For example, the history data structure may indicate throughput for multiple frequencies at multiple interference levels. Control server 260 may obtain information indicating current interference levels of available frequencies, query the history data structure using the current interference levels of available frequencies for corresponding interference levels of the frequencies at past times, and obtain past throughputs associated with the frequencies. Accordingly, control server 260 may select a frequency having the highest throughput given the current interference levels of the available frequencies.

In some implementations, control server 260 may select a frequency based on the time. For example, the history data structure may indicate interference levels at multiple frequencies measured at different times. Control server 260 may predict interference levels at multiple frequencies at future times based on the history data structure. For example, if interference levels at a certain time (e.g., 5:00 PM) and/or date (e.g., 5:00 PM every Thursday) are generally consistent, control server 260 may predict interference levels, at a future time corresponding to the certain time, will be similar. Accordingly, control server 260 may select a frequency based on a current time and predicted interference levels at the current time.

Additionally, or alternatively, control server 260 may predict interference levels at future times based on interference trends indicated by the history data structure. For example, if the history data indicates an interference level at a frequency is increasing or decreasing over time, control server 260 may predict the interference level will continue to increase or decrease. Accordingly, control server 260 may select the frequency using the predicted frequencies that were predicted based on the interference trends.

In some implementations, control server 260 may select a frequency for small cell 220 to use based on a frequency used by another small cell 220. For example, if small cells 220 have coverage ranges that overlap, the small cells 220 may be set to use different frequencies to maximize the number of client devices 210 that may connect to the small cells 220 and/or to reduce interference. Additionally, or alternatively, control server 260 may select a frequency for small cell 220 based on performance information obtained from another small cell 220.

In some implementations, control server 260 may select a frequency based on how often certain client devices 210 connect to small cell 220. The history data structure may include entries associating a client device ID, client device capability information for a client device 210 associated with the client device ID, and times the client device 210 associated with the client device ID connects to small cell 220. Accordingly, control server 260 may determine which client devices 210 connect to small cell 220, how often the client devices 210 connect, and client device capability information for the client devices 210 based on the history data structure. Control server 260 may select a common frequency for client devices 210 that connect to small cell 220 most frequently as the selected frequency.

Various factors have been discussed that may be the basis for determining the frequency. Control server 260 may determine the frequency based on these factors individually or a combination of these factors. In some implementations, a score may be generated for each factor. The scores for each factor may be weighted and combined to determine a total score for each frequency client device 270 supports. Control server 260 may determine the frequency based on the total score for each frequency.

As shown in FIG. 4, process 400 may include providing settings information to small cell 220 and/or client device 210 that indicates the selected frequency (block 480). For example, control server 260 may provide the settings information to small cell 220 and/or client device 210.

Control server 260 may generate settings information that indicates the selected frequency. The settings information may include instructions for small cell 220 and/or client device 210 to adjust settings to use the selected frequency to communicate. Control server 260 may send the settings information to small cell 220 and/or client device 210.

Small cell 220 and client device 210 may receive the settings information. Small cell 220 and client device 210 may set a frequency to use to the selected frequency indicated by the settings information. Client device 210 may connect and/or reconnect to small cell 220 using the selected frequency.

While a series of blocks has been described with regard to FIG. 4, the blocks and/or the order of the blocks may be modified in some implementations. Additionally, or alternatively, non-dependent blocks may be performed in parallel.

Figure 5:
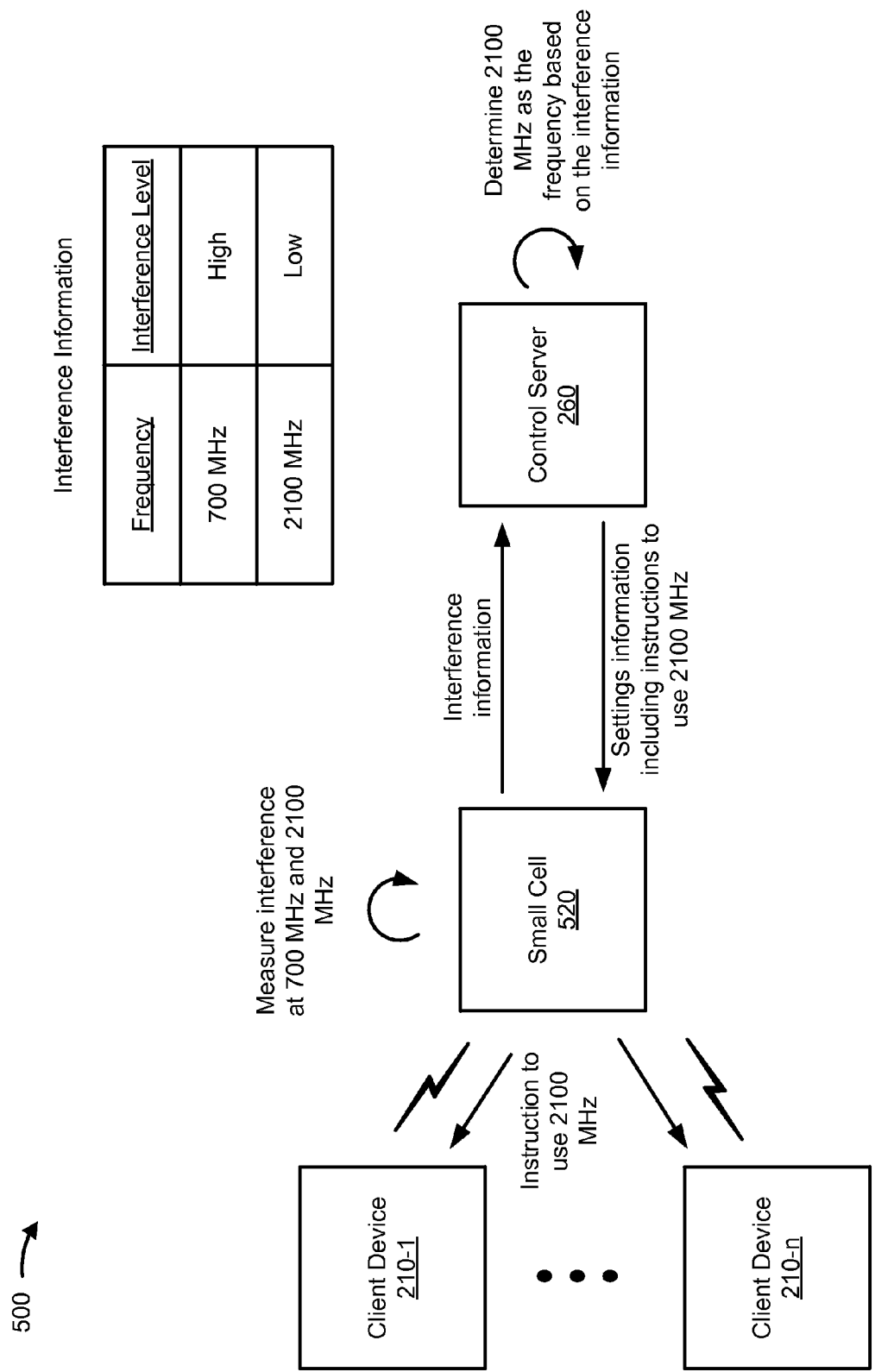
FIG. 5 is a diagram of an example implementation relating to the process shown in FIG. 4.

FIG. 5 is a diagram of an example implementation 500 relating to process 400 shown in FIG. 4. In example implementation 500, a frequency may be determined based on interference information.

Assume client devices 210 and a small cell 220 are capable of communicating using frequencies in the 700 MHz band and the 2100 MHz band. Further, assume client devices 210 initially connect to small cell 220 using a frequency in the 700 MHz band.

Small cell 220 may measure interference levels at frequencies in the 700 MHz band and in the 2100 MHz band. Assume small cell 220 measures the interference level in the 700 MHz band to be high and the interference level in the 2100 MHz band to be low. Small cell 220 may generate interference information indicating the interference levels. Small cell 220 may transmit the interference information to control server 260.

Control server 260 may receive the interference information. Control server 260 may determine small cell 220 and client devices 210 should communicate using the 2100 MHz band based on the interference information indicating a low interference level at the 2100 MHz band and a high interference level at the 700 MHz band. Control server 260 may generate settings information including instructions to use a frequency in the 2100 MHz band. Control server 260 may transmit the settings information to small cell 220 and client devices 210. In some implementations, control server 260 may transmit the settings information to client devices 210 via small cell 220 and/or a macro base station included in an operator network.

Small cell 220 and client devices 210 may receive the settings information and set a frequency to the frequency in the 2100 MHz band indicated by the settings information. Client devices 210 may connect to small cell 220 using the frequency in the 2100 MHz band.

Accordingly, in example implementation 500, control server 260 may select a frequency for client devices 210 and small cell 220 to use to communicate, from among multiple possible frequencies, based on the interference levels of the possible frequencies. In this way, control server 260 may select a frequency having the lowest interference level from among the possible frequencies to establish a stable connection between small cell 220 and client devices 210.

Figure 6:
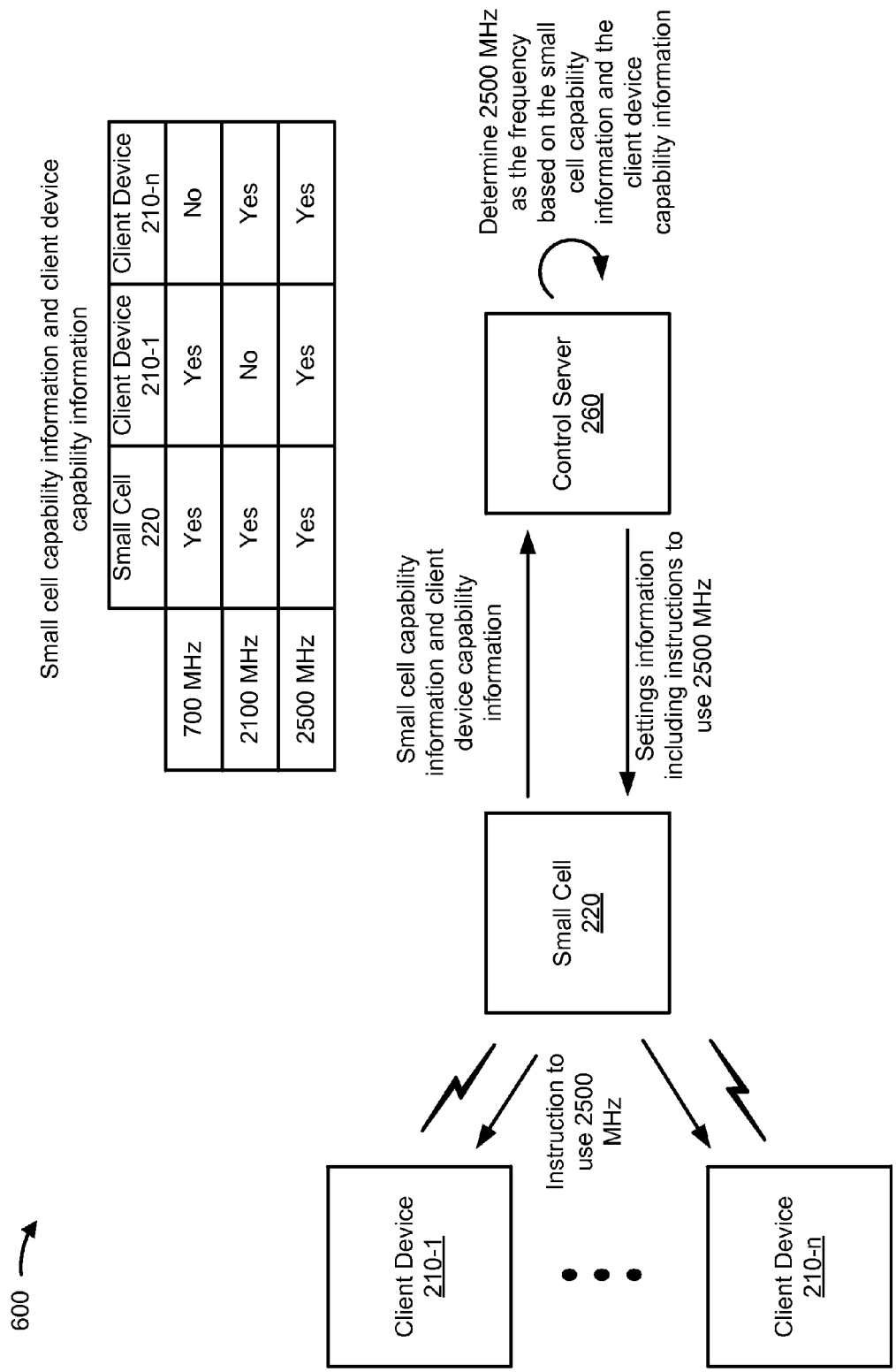
FIG. 6 is a diagram of an example implementation relating to the process shown in FIG. 4.

FIG. 6 is a diagram of an example implementation 600 relating to process 400 shown in FIG. 4. In example implementation 600, a frequency may be determined based on small cell capability information and client device capability information.

Assume a client device 210-1 is capable of communicating using frequencies in the 700 MHz band and the 2500 MHz band, but not the 2100 MHz band. Additionally, assume a client device 210-n is capable of using frequencies in the 2100 MHz and the 2500 MHz band, but not frequencies in the 700 MHz band. Further, assume a small cell 220 is capable of communicating using frequencies in the 700 MHz band, the 2100 MHz band, and the 2500 MHz band.

Control server 260 may obtain small cell capability information indicating the frequencies that small cell 220 may use to communicate. For example, small cell 220 may transmit the small cell capability information to control server 260 and control server 260 may receive the small cell capability information.

Control server 260 may obtain client device capability information indicating the frequencies that client device 210-1 and client device 210-n may use to communicate. For example, client device 210-1 and client device 210-n may transmit the client device capability information to control server 260 (e.g., via small cell 220 and/or a macro base station) and control server 260 may receive the client device capability information.

Control server 260 may determine small cell 220 should communicate using a frequency in the 2500 MHz band based on client device 210-1 and client device 210-n both being able to communicate using the 2500 MHz band. Control server 260 may generate settings information including instructions to use a frequency in the 2500 MHz band. Control server 260 may transmit the settings information to small cell 220, client device 210-1, and client device 210-n. In some implementations, control server 260 may transmit the settings information to client device 210-1 and client device 210-n via small cell 220 and/or a macro base station included in an operator network.

Small cell 220, client device 210-1, and client device 210-n may receive the settings information and set a frequency to use to the frequency in the 2500 MHz band indicated by the settings information. Client device 210-1 and client device 210-n may connect to small cell 220 using the frequency in the 2500 MHz band.

Accordingly, in example implementation 600, control server 260 may select a frequency for client device 210-1, client device 210-n, and small cell 220 to use to communicate, from among multiple possible frequencies, based on which frequencies client device 210-1, client device 210-n, and small cell 220 are capable of using. In this way, control server 260 may select a frequency that maximizes the number of client devices 210 that can connect to small cell 220 at any given time.

Implementations described herein may allow an optimal frequency to be selected for a small cell to use to communicate with client devices from among multiple frequencies the small cell is capable of using. The optimal frequency may maximize throughput to the client devices, maximize a number of client devices that may connect to the small cell, reduce interference in a location of the small cell, and/or reduce a load on a frequency used by an operator network.

The foregoing disclosure provides illustration and description, but is not intended to be exhaustive or to limit the implementations to the precise form disclosed. Modifications and variations are possible in light of the above disclosure or may be acquired from practice of the implementations.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

As used herein, the term "component" is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the term "having" is intended to be an open-ended term. Further, the phrase "based on" is intended to mean "based, at least in part, on" unless explicitly stated otherwise.

What is claimed is:

1. A device, comprising:
   one or more processors to:
   obtain, from a data structure storing information about a closed subscriber group, first capability information indicating a first plurality of frequencies that a plurality of client devices, of the closed subscriber group, are capable of using;
   obtain second capability information indicating a second plurality of frequencies that a small cell is capable of using;
   obtain interference information indicating an interference level at a particular frequency of one or more of the first plurality of frequencies or the second plurality of frequencies,
   a signal strength, of a signal received at the particular frequency, being inversely proportional to the interference level;
   determine performance information associated with at least one of the plurality of client devices or the small cell;
   determine a frequency for the small cell to use to communicate with the plurality of client devices based on the first capability information, the second capability information, the interference information, and the performance information,
   the frequency being the particular frequency; and
   provide frequency information to the small cell instructing the small cell to communicate with the plurality of client devices using the frequency.

2. The device of claim 1, where the one or more processors, when obtaining the interference information, are to:
   receive the interference information from the small cell,
   the interference level being measured by at least one of the small cell or a client device of the plurality of client devices.

3. The device of claim 1, where the one or more processors, when obtaining the interference information, are to:
   receive the interference information from a base station separate from the small cell,
   the small cell being located in a coverage area of the base station, and
   the interference level being measured by at least one of the base station or a client device of the plurality of client devices.

4. The device of claim 1, where the performance information indicates a throughput at the particular frequency.

5. The device of claim 1,
   where the one or more processors are further to:
   obtain history information for the small cell,
   the history information indicating throughputs at interference levels measured at a plurality of times, and
   the plurality of times being prior to a current time, and
   where the one or more processors, when determining the frequency, are to:
   determine the frequency based on the history information.

6. The device of claim 5, where the one or more processors, when determining the frequency, are to:
   determine an optimal frequency as the frequency,
   the optimal frequency having a highest throughput, as indicated by the history information, from among the second plurality of frequencies.

7. The device of claim 1,
   where the one or more processors are further to:
   obtain history information for the small cell,
   the history information indicating past interference levels at a plurality of times, and
   where the one or more processors, when determining the frequency, are to:
   determine the frequency based on the history information.

8. The device of claim 7, where the one or more processors, when determining the frequency, are to:
   determine an optimal frequency as the frequency,
   the optimal frequency having a lowest interference level as predicted based on the history information.

9. A non-transitory computer-readable medium storing instructions, the instructions comprising:
   a plurality of instructions that, when executed by a processor of a device, cause the processor to:
   obtain, from a data structure storing information about a closed subscriber group, client capability information indicating a first plurality of frequencies that a plurality of client devices, of the closed subscriber group, are capable of using to communicate with a small cell;
   determine cell capability information indicating a second plurality of frequencies that the small cell is capable of using to communicate with the plurality of client devices;
   determine interference information that indicates an interference level at a particular frequency of one or more of the first plurality of frequencies or the second plurality of frequencies;
   determine performance information associated with at least one of the plurality of client devices or the small cell;
   determine a frequency for the small cell to use to communicate with the plurality of client devices based on the client capability information, the cell capability information, the interference information, and the performance information;
   the frequency being the particular frequency, and
   a signal strength, of a signal received at the frequency, being inversely proportional to the interference level; and
   provide frequency information to the small cell instructing the small cell to communicate with the plurality of client devices using the frequency.

10. The non-transitory computer-readable medium of claim 9, where the plurality of instructions, when determining the frequency, cause the processor to:

determine the frequency based on a quantity of the plurality of client devices capable of communicating at each of the first plurality of frequencies.

11. The non-transitory computer-readable medium of claim 10, where the plurality of instructions, when determining the frequency, cause the processor to:
determine an optimal frequency as the frequency,
a largest quantity of the plurality of client devices being capable of communicating at the optimal frequency from among the first plurality of frequencies.

12. The non-transitory computer-readable medium of claim 9, where the plurality of instructions, when determining the client capability information, cause the processor to:
receive the client capability information from the small cell,
the plurality of client devices being connected to the small cell.

13. The non-transitory computer-readable medium of claim 9, where the plurality of instructions, when determining the client capability information, cause the processor to:
receive the client capability information from a base station separate from the small cell,
the small cell being located within a coverage range of the base station.

14. The non-transitory computer-readable medium of claim 9, where the plurality of instructions, when determining the frequency, cause the processor to:
determine an optimal frequency as the frequency based on the client capability information, the cell capability information, the interference information, the performance information, and history information,
the optimal frequency having a lowest interference level as indicated by the history information.

15. A method, comprising:
obtaining, by a device and from a data structure storing information about a closed subscriber group, first capability information indicating a first plurality of frequencies that a plurality of client devices, of the closed subscriber group, are capable of using;
obtaining, by the device, second capability information indicating a second plurality of frequencies that a small cell that is capable of using;
receiving, by the device, interference information indicating a signal strength level, of a signal received at a particular frequency of one or more of the first plurality of frequencies or the second plurality of frequencies, that is inversely proportional to an interference level;
identifying, by the device, performance information associated with the small cell;
selecting, by the device, a frequency for the small cell to use to communicate with a client device, of the plurality of client devices, based on the performance information, the interference information, the first capability information, and the second capability information,
the frequency being the particular frequency; and
transmitting, by the device, frequency information to the small cell instructing the small cell to communicate with a client device, of the plurality of client devices, using the frequency.

16. The method of claim 15, further comprising:
obtaining information indicating another frequency that another small cell is using to communicate,
where selecting the frequency includes selecting the frequency based on the other frequency that the other small cell is using to communicate.

17. The method of claim 15, further comprising:
obtaining small cell information indicating frequencies used by at least one other small cell,
where selecting the frequency includes selecting the frequency based on the small cell information.

18. The method of claim 15, where selecting the frequency comprises:
selecting, by the device, an optimal frequency as the frequency based on the performance information, the interference information, the first capability information, the second capability information, and history information,
the optimal frequency having a lowest interference level as indicated by the history information.

* * * * *